US010111096B2

(12) United States Patent
Cao et al.

(10) Patent No.: US 10,111,096 B2
(45) Date of Patent: Oct. 23, 2018

(54) AP CONNECTION METHOD, TERMINAL, AND SERVER

(71) Applicant: TENCENT TECHNOLOGY (SHENZHEN) COMPANY LIMITED, Shenzhen, Guangdong (CN)

(72) Inventors: Yue Cao, Shenzhen (CN); Yuancheng Cao, Shenzhen (CN); Manzhao Bu, Shenzhen (CN); Ping Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 209 days.

(21) Appl. No.: 15/160,622

(22) Filed: May 20, 2016

(65) Prior Publication Data
US 2016/0269901 A1 Sep. 15, 2016

Related U.S. Application Data

(63) Continuation of application No. PCT/CN2015/078575, filed on May 8, 2015.

(30) Foreign Application Priority Data

May 12, 2014 (CN) .......................... 2014 1 0198556

(51) Int. Cl.
*H04L 29/06* (2006.01)
*H04W 12/06* (2009.01)
(Continued)

(52) U.S. Cl.
CPC ........... *H04W 12/06* (2013.01); *H04L 9/3226* (2013.01); *H04W 12/02* (2013.01); *H04W 12/04* (2013.01); *H04W 88/08* (2013.01); *Y02D 70/142* (2018.01)

(58) Field of Classification Search
CPC ..................................................... H04W 12/06
See application file for complete search history.

(56) References Cited

U.S. PATENT DOCUMENTS 7,042,852 B2 * 5/2006 Hrastar ............... H04L 63/1408
370/277
7,664,527 B2 * 2/2010 Bari ...................... H04W 12/06
455/550.1
(Continued)

FOREIGN PATENT DOCUMENTS

CN 102724668 A 10/2012
CN 103281755 A 9/2013
(Continued)

OTHER PUBLICATIONS

International Search Report in international application No. PCT/CN2015/078575, dated Aug. 11, 2015.
(Continued)

*Primary Examiner* — Shawnchoy Rahman
(74) *Attorney, Agent, or Firm* — Anova Law Group, PLLC

(57) ABSTRACT

The present disclosure discloses an access point (AP) connection method, a terminal, and a server, and relates to the field of network technologies. The method includes: scanning a graphic identifier of a target AP, to obtain address information of the target AP, where the address information includes at least an identity of the target AP; acquiring, according to the identity and an operating system identifier of a terminal, target AP connection information prestored in a server; and connecting to the target AP according to the target AP connection information. In the present disclosure, after scanning a graphic identifier of a target AP, a terminal acquires, according to the identity and an operating system identifier of a terminal, target AP connection information prestored in a server; and connects to the target AP according
(Continued)

to the target AP connection information, thereby implementing a connection to the target AP according to the graphic identifier of the target AP, which not only is convenient and fast, and time-saving and energy-saving, but also avoids, no matter how complex the access password is, a connection failure due to an excessively complex access password during a connection.

17 Claims, 4 Drawing Sheets

(51) Int. Cl.
*H04W 12/02* (2009.01)
*H04W 12/04* (2009.01)
*H04L 9/32* (2006.01)
*H04W 88/08* (2009.01)

(56) References Cited

U.S. PATENT DOCUMENTS

| | | | | |
|---|---|---|---|---|
| 9,083,531 | B2* | 7/2015 | Chenna | H04L 9/3247 |
| 2005/0054369 | A1 | 3/2005 | Yoshihito | |
| 2010/0299712 | A1* | 11/2010 | Austin | H04N 7/163 |
| | | | | 725/81 |
| 2014/0254390 | A1* | 9/2014 | Ansley | H04W 24/10 |
| | | | | 370/241 |
| 2015/0023350 | A1* | 1/2015 | Carames | H04L 45/74 |
| | | | | 370/392 |
| 2015/0085746 | A1* | 3/2015 | Somayazulu | H04W 48/08 |
| | | | | 370/328 |
| 2015/0143473 | A1* | 5/2015 | Jung | H04W 12/06 |
| | | | | 726/4 |
| 2016/0112901 | A1* | 4/2016 | Liu | H04L 69/08 |
| | | | | 370/310 |

FOREIGN PATENT DOCUMENTS

| | | |
|---|---|---|
| CN | 103402275 A | 11/2013 |
| CN | 103415013 A | 11/2013 |
| CN | 103491537 A | 1/2014 |
| CN | 103607713 A | 2/2014 |
| CN | 104378758 A | 2/2015 |

OTHER PUBLICATIONS

English Translation of the Written Opinion of the International Search Authority in international application No. PCT/CN2015/078575, dated Aug. 11, 2015.

Notification of the First Office Action of Chinese application No. 201410198556.6, dated Aug. 31, 2015.

* cited by examiner

AP CONNECTION METHOD, TERMINAL, AND SERVER

CROSS REFERENCE TO RELATED APPLICATIONS

This is a continuation application of International Patent Application No. PCT/CN2015/078575, filed on May 8, 2015, which claims priority to Chinese Patent Application No. 201410198556.6 filed on May 12, 2014, the disclosures of which are incorporated by reference herein in their entirety.

FIELD OF THE TECHNOLOGY

The present disclosure relates to the field of network technologies, and in particular, to an access point (AP) connection method, a terminal, and a server.

BACKGROUND OF THE DISCLOSURE

Wireless fidelity (WiFi) is a technology that can connect terminals such as a personal computer and a handheld device (such as a personal digital assistant or a mobile phone) to each other in a wireless manner. As a wireless network technology thrives, WiFi gains popularity among a vast number of users with advantages such as a high transmission speed, strong compatibility, and low costs. Due to a limited WIFI coverage at present, a wireless AP is often used to create WiFi in a limited network environment, so that a terminal device accesses and uses WIFI. After operating the terminal device and accessing the AP, a user can perform an operation such as webpage browsing or video watching.

In some scenarios, during an AP connection, a service set identifier (SSID) and a password of the AP are generally displayed on a display interface of a personal computer (PC) connected to the AP. After opening an AP information list of the terminal device, the user queries the AP information list for the AP according to the SSID displayed on the display interface of the PC; and then enters the password displayed on the display interface of the PC at a page location at which the AP is located, so that the terminal device is connected to the AP.

Because the AP connection needs to be performed according to the SSID and the password of the AP, when the SSID or the password is long or complex, it is not only error-prone but also time-consuming to perform the AP connection. Therefore, this connection manner is complex, less convenient and has a slow speed.

SUMMARY

Based on the above, embodiments of the present invention provide an AP connection method, a terminal, and a server. The technical solutions are as follows:

According to one aspect, an AP connection method is provided, including:

scanning a graphic identifier of a target AP, to obtain address information of the target AP, the address information including at least an identity of the target AP;

acquiring, according to the identity and an operating system identifier of a terminal, target AP connection information prestored in a server; and connecting to the target AP according to the target AP connection information.

According to another aspect, an AP connection method is provided, including:

receiving a target AP connection request sent by a terminal, the target AP connection request including an operating system identifier of the terminal and an identity of a target AP;

acquiring target AP connection information according to the target AP connection request; and sending the target AP connection information to the terminal, so that the terminal connects to the target AP according to the target AP connection information.

According to still another aspect, a terminal is provided, including:

a graphic identifier scanning module, configured to scan a graphic identifier of a target AP, to obtain address information of the target AP, the address information including at least an identity of the target AP;

a connection information acquiring module, configured to acquire, according to the identity and an operating system identifier of the terminal, target AP connection information prestored in a server; and an AP connection module, configured to connect to the target AP according to the target AP connection information.

According to yet another aspect, a server is provided, including:

a connection request receiving module, configured to receive a target AP connection request sent by a terminal, the target AP connection request including an operating system identifier of the terminal and an identity of a target AP;

a connection information acquiring module, configured to acquire target AP connection information according to the target AP connection request; and a connection information sending module, configured to send the target AP connection information to the terminal, so that the terminal connects to the target AP according to the target AP connection information.

After scanning a graphic identifier of a target AP, to obtain an identity of the target AP, a terminal acquires, according to the identity and an operating system identifier of a terminal, target AP connection information prestored in a server; and connects to the target AP according to the target AP connection information, thereby implementing a connection to the target AP according to the graphic identifier of the target AP, which not only is convenient and fast, and time-saving and energy-saving, but also avoids, no matter how complex the access password is, a connection failure caused by an excessively complex access password during a connection; and in addition, for an AP owner, other terminals connect to the AP by using a graphic identifier of the AP, and therefore sharing of a wireless network can be implemented without sharing the access password, which protects privacy of the AP owner.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

DESCRIPTION OF EMBODIMENTS

In order to make technical solutions and advantages of the present disclosure clearer, embodiments of the present invention are described in detail in the following with reference to accompanying drawings.

Figure 1:
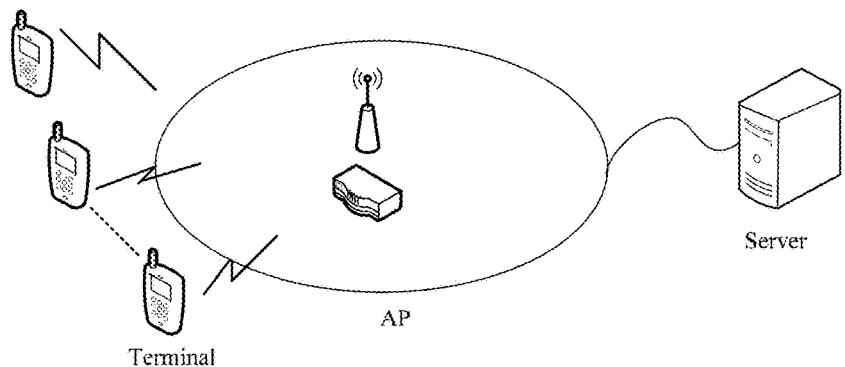
FIG. 1 is a schematic architecture diagram of a wireless network system according to an embodiment of the present invention.

Before the detailed description of the embodiments of the present invention, an application scenarios of the embodiments of the present invention is described first. Referring to FIG. 1, for a wired network owner, if inserting a portable wireless AP device (for example, a mini-router) into a personal computer (PC), the owner can create a wireless network environment. After establishing a connection to an AP, a terminal located within coverage of the wireless network can perform an operation such as webpage accessing or video watching. In a process in which the terminal establishes the connection to the AP, in order that the terminal connects to the AP without leaking AP connection information, in the embodiments of the present invention, a corresponding graphic identifier (for example, a two-dimensional code) is set for the AP. After a graphic identifier scanning client installed on the terminal scans the graphic identifier corresponding to the AP, the terminal can automatically connect to the AP, which is time-saving and convenient. A main connection process includes that: a terminal first scans a graphic identifier of a target AP, to obtain address information of the target AP, where the address information includes at least an identity of the target AP; then, the terminal acquires, according to the identity and an operating system identifier of the terminal, target AP connection information prestored in a server shown in FIG. 1; and finally, the terminal connects to the target AP according to the target AP connection information. By using the AP connection method provided in the embodiments, terminals within the coverage of the wireless network can quickly establish a connection to an AP. Refer to the following embodiments for details about a specific implementation process.

Figure 2:
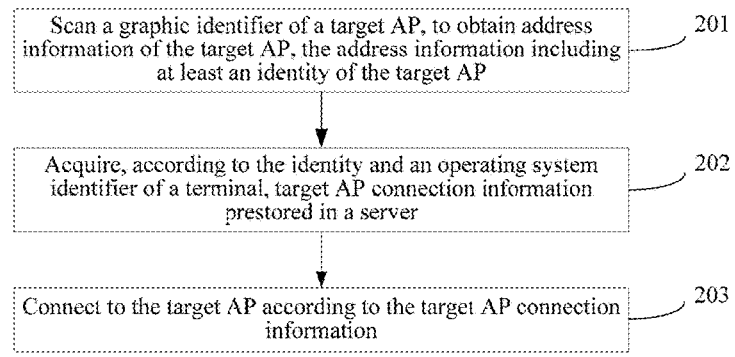
FIG. 2 is a flowchart of an AP connection method according to an embodiment of the present invention.

FIG. 2 is a flowchart of an AP connection method according to an embodiment of the present invention. Referring to FIG. 2, by using an angle from which a terminal executes the method as an example, a process of the method provided in this embodiment includes:

201: Scan a graphic identifier of a target AP, to obtain address information of the target AP, where the address information includes at least an identity of the target AP.

202: Acquire, according to the identity and an operating system identifier of a terminal, target AP connection information prestored in a server.

203: Connect to the target AP according to the target AP connection information.

In the method provided in this embodiment of the present invention, after scanning a graphic identifier of a target AP, to obtain an identity of the target AP, a terminal acquires, according to the identity and an operating system identifier of a terminal, target AP connection information prestored in a server; and connects to the target AP according to the target AP connection information, thereby implementing a connection to the target AP according to the graphic identifier of the target AP, which not only is convenient and fast, and time-saving and energy-saving, but also avoids, no matter how complex the access password is, a connection failure caused by an excessively complex access password during a connection; and in addition, for an AP owner, other terminals connect to the AP by using a graphic identifier of the AP, and therefore sharing of a wireless network can be implemented without sharing the access password, which protects privacy of the AP owner.

Optionally, the acquiring, according to the identity and an operating system identifier of a terminal, target AP connection information prestored in a server includes:

generating a target AP connection request according to the identity and the operating system identifier of the terminal;

sending the target AP connection request to the server, so that the server acquires the target AP connection information according to the target AP connection request; and receiving the target AP connection information returned by the server.

Optionally, when the operating system identifier is a first operating system identifier, the target AP connection information includes an encrypted SSID and an encrypted access password of the target AP, and the connecting to the target AP according to the target AP connection information includes:

decrypting, according to a preset rule, the target AP connection information returned by the server, to obtain the SSID and the access password of the target AP; and invoking a terminal system service to connect to the target AP according to the SSID and the access password of the target AP.

Optionally, when the operating system identifier is a second operating system identifier, the target AP connection information is download address information, and the connecting to the target AP according to the target AP connection information includes:

acquiring, according to the target AP connection information, a configuration description file generated by the server; and invoking a terminal system service to install the configuration description file, to connect to the target AP.

Optionally, the method further includes:

displaying, if the graphic identifier of the target AP becomes invalid, failure prompt information indicating a failure in acquiring the target AP connection information.

The foregoing all optional technical solutions may form an optional embodiment of the present invention by using any combination. Details are not provided one by one again herein.

Figure 3:
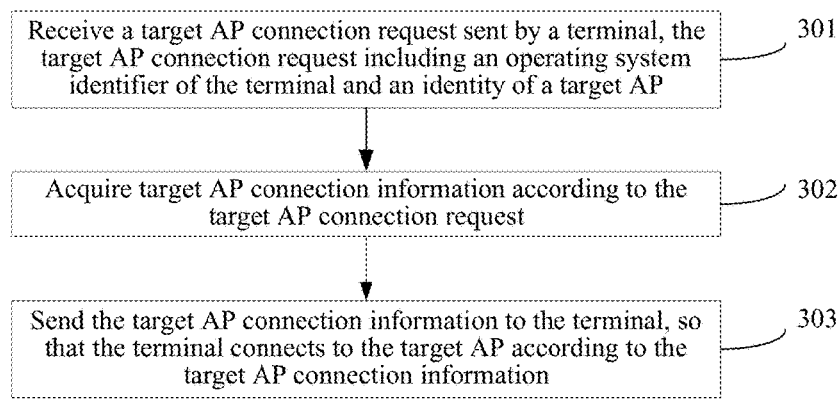
FIG. 3 is a flowchart of an AP connection method according to an embodiment of the present invention.

FIG. 3 is a flowchart of an AP connection method according to an embodiment of the present invention. Referring to FIG. 3, by using an angle from which a server executes the method as an example, a process of the method provided in this embodiment includes:

301: Receive a target AP connection request sent by a terminal, where the target AP connection request includes an operating system identifier of the terminal and an identity of a target AP.

302: Acquire target AP connection information according to the target AP connection request.

303: Send the target AP connection information to the terminal, so that the terminal connects to the target AP according to the target AP connection information.

In the method provided in this embodiment of the present invention, after scanning a graphic identifier of a target AP, a terminal sends a target AP connection request that includes an identity and an operating system identifier of the terminal to a server; and after obtaining the target AP connection request, the server acquires target AP connection information according to the target AP connection request, and sends the target AP connection information to the terminal, so that the terminal connects to the target AP according to the target AP connection information, thereby implementing a connection to the target AP according to the graphic identifier of the target AP, which not only is convenient and fast, and time-saving and energy-saving, but also avoids, no matter how complex the access password is, a connection failure caused by an excessively complex access password during a connection; and in addition, for an AP owner, other terminals connect to the AP by using a graphic identifier of the AP, and therefore sharing of a wireless network can be implemented without sharing the access password, which protects privacy of the AP owner.

Optionally, the acquiring the target AP connection information according to the target AP connection request includes:

searching, according to the identity when the operating system identifier is a first operating system identifier, a prestored correspondence between connection information and an identity for connection information corresponding to the identity, and determining the target AP connection information according to the found connection information, where the connection information includes an SSID and an access password; or acquiring, when the operating system identifier is a second operating system identifier, download address information corresponding to the second operating system identifier, and using the download address information as the target AP connection information.

Optionally, before the receiving a target AP connection request sent by a terminal, the method further includes:

receiving target AP connection information uploaded by the terminal connected to the target AP, where the target AP connection information includes at least an SSID and an access password of the target AP; and configuring at least the identity for the target AP.

Optionally, after the configuring at least the identity for the target AP, the method further includes:

generating address information of the target AP, where the address information includes at least the identity.

Optionally, after the generating address information of the target AP, the method further includes:

generating a graphic identifier corresponding to the address information, and returning the graphic identifier to the terminal connected to the target AP.

The foregoing all optional technical solutions may form an optional embodiment of the present invention by using any combination. Details are not provided one by one again herein.

Figure 4:
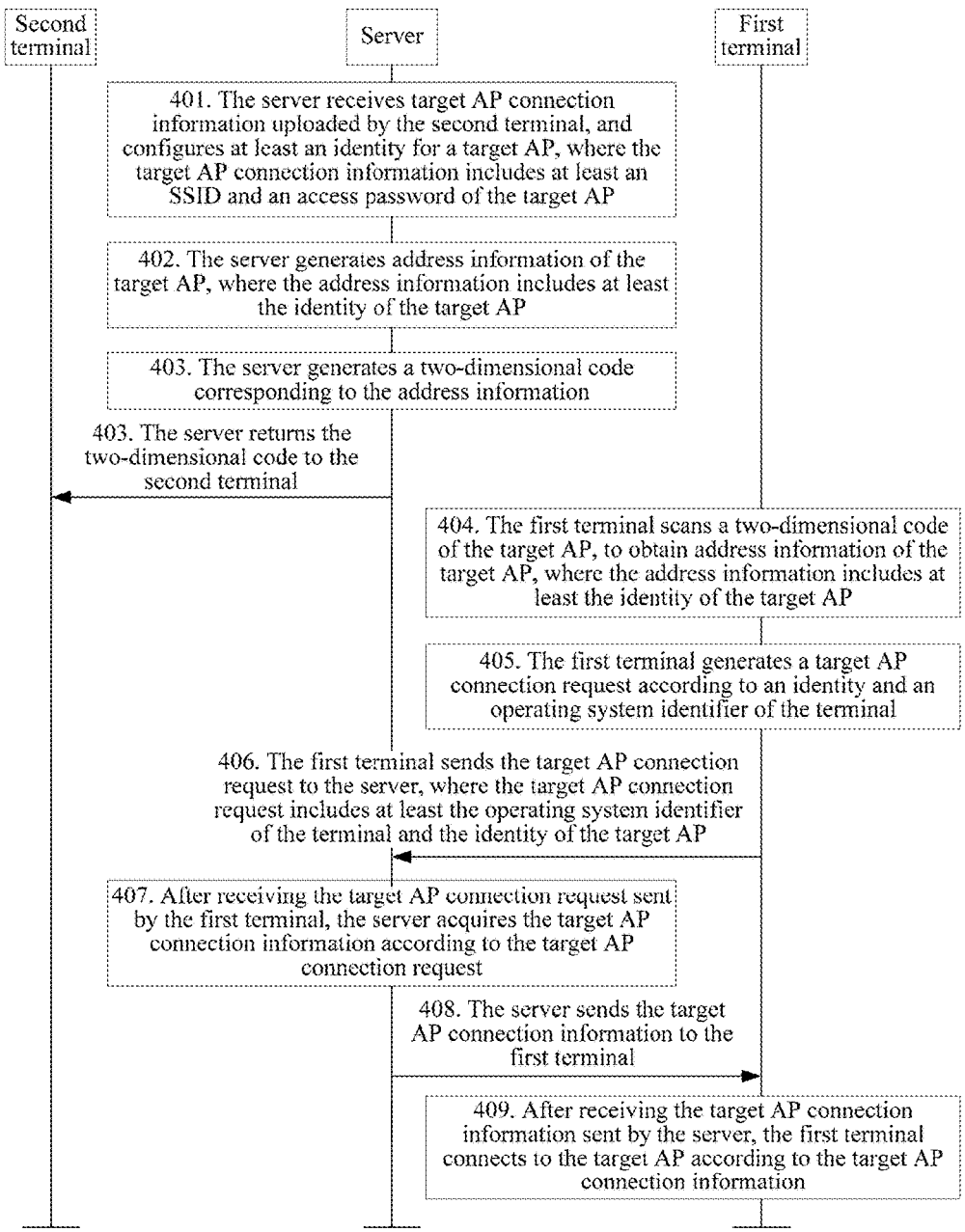
FIG. 4 is a flowchart of an AP connection method according to an embodiment of the present invention.

FIG. 4 is a flowchart of an AP connection method according to an embodiment of the present invention, where a first terminal, a second terminal, and a server interact with each other. The first terminal refers to a terminal that is located within coverage of a wireless network and does not establish a connection to a target AP; and the second terminal refers to a terminal that is connected to the target AP, that is, a terminal into which a wireless AP is inserted, which is usually a PC. By using an example in which a graphic identifier is a two-dimensional code, referring to FIG. 4, a process of the method provided in this embodiment includes:

401: A server receives target AP connection information uploaded by a second terminal, and configures at least an identity for a target AP, where the target AP connection information includes at least an SSID and an access password of the target AP.

In this embodiment of the present invention, after the wireless AP shown in FIG. 1 is inserted into the second terminal, a client runs on the second terminal, where the client is responsible for creating WiFi and guiding a user of the second terminal to set the SSID and the access password of the AP. After setting the SSID and the access password of the AP, the user of the second terminal encrypts, according to a preset encryption algorithm, the target AP connection information that includes at least the SSID and the access password, to generate an encrypted character string, and uploads the encrypted character string to the server. The foregoing process is also usually executed by the client that runs on the second terminal. After receiving the encrypted target AP connection information uploaded by the second terminal, the server may decrypt the encrypted character string by using a preset decryption algorithm corresponding to the preset encryption algorithm, to obtain the SSID and the access password of the target AP.

The preset encryption algorithm may be any reversible existing encryption algorithm or user-defined encryption algorithm, which is not specifically limited in this embodiment. The preset decryption algorithm and the preset encryption algorithm are inverse operations of each other.

In addition, in addition to the SSID and the access password of the target AP, the target AP connection information may further include other information, such as setting time of the SSID and the access password. This embodiment also does not specifically limit content included in the target AP connection information.

In addition, a large amount of AP connection information may be stored in the server; and therefore, in order that the server can conveniently distinguish connection information of various APs, in the method provided in this embodiment, an identity (ID) may be further configured for each AP that is in the server and stores AP connection information, and then the stored multiple pieces of AP connection information may be searched for the target AP connection information according to the identity. During identity configuration for the target AP, a unique character or character string may be allocated to the target AP, and the character or the character string is used as the identity of the target AP.

Optionally, to improve security of an AP connection in a subsequent process, during identity allocation to the target AP, a security verification key (Key) may further be allocated to the target AP, where the security verification key may be a character, a binary numerical value, a hexadecimal numerical value, or the like. This embodiment does not specifically limit the form of the security verification key. If the identity and the security verification key are configured for each AP that is in the server and stores AP connection information, during a search for the target AP connection information according to the identity of the target AP in a subsequent process, the security verification key needs to be further authenticated. Refer to the following step 407 for details about a specific process.

402: The server generates address information of the target AP, where the address information includes at least the identity of the target AP.

In this embodiment of the present invention, after an identity is configured for the target AP, a piece of address information is further generated for the target AP. Reference may be made to an existing address generation manner for a specific address information generation manner, which is not specifically limited in this embodiment, as long as each AP corresponds to one unique piece of address information.

The address information specifically may be a uniform resource locator (URL), where the URL may further include, in addition to the identity of the target AP, the security verification key (Key) of the target AP shown in the foregoing step 401. This embodiment also does not specifically limit content included in the address information.

403: The server generates a two-dimensional code corresponding to the address information, and returns the two-dimensional code to the second terminal.

In this embodiment of the present invention, the first terminal establishes a connection to the target AP by using a two-dimensional code of the target AP. Therefore, after the address information of the target AP is generated, the two-dimensional code corresponding to the address information further needs to be generated. The target AP corresponds to one piece of address information, and the address information further corresponds to one two-dimensional code. Therefore, the target AP corresponds to one two-dimensional code. Generation of the two-dimensional code corresponding to the address information may be implemented by using a two-dimensional code generator.

After the two-dimensional code is generated, the server returns the two-dimensional code to the second terminal, so that after receiving the two-dimensional code, the second terminal places the two-dimensional code on a two-dimensional code carrier, for the first terminal to scan. The two-dimensional code carrier may be a display interface of the second terminal, a surface of the wireless AP, print paper pasted on the second terminal or the wireless AP, or the like. This embodiment does not specifically limit the two-dimensional code carrier.

It should be noted that, the foregoing specific process of generating the two-dimensional code corresponding to the target AP may also be executed on the side of the second terminal, which is not specifically limited in this embodiment. In this embodiment of the present invention, description is provided only by using an example in which the process of generating the two-dimensional code is executed on the side of the server. If the process of generating the two-dimensional code is executed on the side of the second terminal, after generating the address information corresponding to the target AP, the server directly sends the address information to the second terminal.

In addition, after the two-dimensional code of the target AP is generated in the foregoing step 401 to step 403, for a user of the first terminal, a connection to the target AP may be established by scanning the two-dimensional code of the target AP with a two-dimensional code scanner installed on the first terminal. Refer to the following step 404 to step 407 for details about a specific connection process.

404: A first terminal scans the two-dimensional code of the target AP, to obtain address information of the target AP, where the address information includes at least the identity of the target AP.

In this embodiment of the present invention, the first terminal may specifically scan, in the following implementation manner, the two-dimensional code of the target AP: scanning the two-dimensional code of the target AP by using the two-dimensional code scanner installed on the first terminal; or scanning the two-dimensional code of the target AP by using social software or a browser that has a function of scanning a two-dimensional code and is installed on the first terminal. Certainly, in addition to the foregoing two-dimensional code scanning manner, another scanning manner may also be used, which is not specifically limited in this embodiment.

In addition, each two-dimensional code corresponds to one piece of address information. Therefore, after the two-dimensional code of the target AP is scanned, the address information corresponding to the two-dimensional code may be obtained. The address information includes at least the identity of the target AP. If the server further configures the security verification key for the target AP during identity configuration for the target AP, the address information corresponding to the two-dimensional code further includes the security verification key of the target AP.

405: The first terminal generates a target AP connection request according to an identity and an operating system identifier of the terminal.

For an intelligent terminal, a system of the intelligent terminal is generally an IOS system or an Android system. Therefore, the operating system identifier of the terminal is generally classified into two types: an "ios" identifier and an "android" identifier. Certainly, in addition to the foregoing two types, the operating system identifier of the terminal may further include an operating system identifier of another type, which is not specifically limited in this embodiment. In this embodiment, description is provided only by using an example in which the operating system identifier of the terminal includes the "ios" identifier and the "android" identifier.

In this embodiment, the identity of the target AP has been acquired according to the foregoing step 404. Therefore, the target AP connection request that includes at least the identity and the operating system identifier of the terminal may be generated. It should be noted that, in addition to the identity of the target AP and the operating system identifier of the terminal, the target AP connection request may further include the security verification key of the target AP, and the like. This embodiment does not specifically limit content included in the target AP connection request.

406: The first terminal sends the target AP connection request to the server, where the target AP connection request includes at least the operating system identifier of the terminal and the identity of the target AP.

In this embodiment of the present invention, when sending the target AP connection request to the server, the first terminal may adopt a manner of directly sending the target AP connection request to the server, or may adopt a manner of sending the target AP connection request in a package form to the server. This embodiment does not specifically limit the sending manner.

407: After receiving the target AP connection request sent by the first terminal, the server acquires the target AP connection information according to the target AP connection request.

After receiving the target AP connection request sent by the first terminal, the server may temporarily store the target AP connection request in a storage medium of the server for ease of processing in a subsequent process. The storage medium specifically may be memory, flash memory, or the like. This embodiment does not specifically limit the type of the storage medium. In this embodiment of the present invention, when acquiring the target AP connection information according to the target AP connection request, the server adopts the following two acquiring manners according to different operating system identifiers of the first terminal.

First manner: when the operating system identifier is a first operating system identifier, a prestored correspondence between connection information and an identity is searched, according to the identity, for connection information corresponding to the identity, and the target AP connection information is determined according to the found connection information, where the target AP connection information includes the SSID and the access password of the target AP.

For the first manner, the first operating system identifier refers to the "android" identifier shown in the foregoing step 405. After configuring the identities for the APs, the server stores the correspondence between connection information and an identity of each AP. In this way, in a subsequent process, the target AP connection information may be acquired quickly according to the identity of the target AP, where the target AP connection information includes the SSID and the access password of the target AP. If the operating system identifier of the first terminal is the "android" identifier, the server may find the connection information corresponding to the identity by traversing the correspondence between the connection information and the identity according to the identity carried in the target AP connection request, where the connection information is the target AP connection information.

It should be noted that, in the foregoing step 401, if the server further configures the security verification key for the target AP during identity configuration for the target AP, before searching, according to the identity, the prestored correspondence between the connection information and the identity for connection information corresponding to the identity, the server further needs to authenticate the security verification key. Only after the authentication of security verification key succeeds, the target AP connection information can be acquired according to the identity. During authentication of the security verification key, an authentication form varies according to the different forms of the security verification key. For example, by using an example in which the security verification key configured by the server for the target AP is a character "A", during authentication of the security verification key, it may be determined whether the security verification key carried in the target AP connection request is the character "A"; and if the security verification key carried in the target AP connection request is the character "A", the authentication succeeds, and subsequent steps are performed; or if the security verification key carried in the target AP connection request is not the character "A", the authentication fails, and the processing procedure ends. If the security verification key is in the form of a record validity period, it is determined whether the validity period of the security verification key carried in the target AP connection request expires; and if the validity period of the security verification key carried in the target AP connection request does not expire, the authentication succeeds, and subsequent steps are performed; or if the validity period of the security verification key carried in the target AP connection request expires, the authentication fails, and the processing procedure ends.

Second manner: when the operating system identifier is a second operating system identifier, download address information corresponding to the second operating system identifier is acquired, and the download address information is used as the target AP connection information.

For the second manner, the second operating system identifier refers to the "ios" identifier. For an intelligent terminal whose operating system is the IOS system, the target AP connection information acquired by the server is different from the target AP connection information acquired in the first manner. When the operating system identifier is the "ios" identifier, the acquired target AP connection information is download address information. The download address information corresponds to a configuration description file, and the configuration description file is a WiFi plug-in, which is automatically generated by the server according to the SSID and the access password of the target AP, and applies to the intelligent terminal whose operating system is the IOS system. A connection may be established between the first terminal and the target AP by using the configuration description file.

408: The server sends the target AP connection information to the first terminal.

In this embodiment of the present invention, when sending the target AP connection information to the first terminal, the server may adopt a manner of directly sending the target AP connection information to the first terminal, or may adopt a manner of sending the target AP connection information in an encrypted form to the first terminal. This embodiment does not specifically limit the sending manner. In this embodiment, description is provided only by using an example in which the server sends the encrypted target AP connection information to the first terminal.

409: After receiving the target AP connection information sent by the server, the first terminal connects to the target AP according to the target AP connection information.

In this embodiment of the present invention, according to different operating systems, the first terminal may connect to the target AP according to the target AP connection information in the following two manners:

First manner: when the operating system identifier is the "android" identifier, after the encrypted target AP connection information sent by the server is received, the encrypted target AP connection information is decrypted according to a preset rule, to obtain the SSID and the access password of the target AP; and a terminal system service is invoked to connect to the target AP according to the SSID and the access password of the target AP.

The preset rule refers to a decryption algorithm corresponding to an encryption algorithm for encrypting the target AP connection information. After obtaining the SSID and the access password of the target AP, the first terminal automatically invokes the terminal system service to connect to the target AP according to the SSID and the access password of the target AP.

It should be noted that, after obtaining the SSID and the access password of the target AP, the first terminal may directly establish a connection to the target AP without the need of participation of the user of the first terminal. After the connection succeeds, connection success prompt information is displayed. After scanning the two-dimensional code of the target AP, the user of the first terminal does not need to perform any operation. The entire connection process is transparent for the user of the first terminal.

Second manner: when the operating system identifier is the "ios" identifier, the target AP connection information is download address information, and a configuration description file is acquired according to the target AP connection information; and the terminal system service is invoked to install the configuration description file, to connect to the target AP.

The download address information and the configuration description file are both generated by the server. The configuration description file may be acquired from the server according to the download address information. After acquiring the configuration description file, the first terminal automatically invokes the terminal system service to install the configuration description file. After successfully installing the configuration description file, the first terminal establishes a connection to the target AP.

It should be noted that, after obtaining the download address information, the first terminal may directly establish a connection to the target AP without the need of participation of the user of the first terminal. After the connection succeeds, connection success prompt information is displayed. After scanning the two-dimensional code of the target AP, the user of the first terminal does not need to perform any operation. The entire connection process is transparent for the user of the first terminal.

In addition, an objective of establishing a connection to the target AP by scanning the two-dimensional code of the target AP is achieved in the foregoing step 401 to step 409. The user rarely participates in the entire connection establishing process, and no matter how complex the access password (including uppercase and lowercase letters, numbers, and symbols) is, no error occurs during the AP connection, which is time-saving and energy-saving. Certainly, for consideration of security, the user of the second terminal may periodically change the access password of the target AP. Each time the access password is changed, the two-dimensional code previously generated becomes invalid. The user of the first terminal possibly does not know this, and the user of the first terminal cannot access the target AP even if scanning the two-dimensional code. Under this circumstance, to prompt the user of the first terminal that the two-dimensional code becomes invalid, the method provided in this embodiment further includes the following step: displaying, if the two-dimensional code of the target AP becomes invalid, failure prompt information indicating a failure in acquiring the target AP connection information. For different operating systems of the second terminal, there are different manners of displaying the failure prompt information.

For the IOS operating system, after the two-dimensional code of the target AP becomes invalid, the server automatically generates a failure prompt information page that includes, for example, "The two-dimensional code becomes invalid, and the connection fails", and returns the failure prompt information page to the second terminal, to remind the user of the second terminal that the two-dimensional code scanned just now has become invalid.

For the Android operating system, an application for scanning the two-dimensional code has generated in advance the failure prompt information page that includes, for example, "The two-dimensional code becomes invalid, and the connection fails"; and therefore after the two-dimensional code of the target AP becomes invalid, the application for scanning the two-dimensional code informs, after detecting this case, the second terminal of a URL for accessing the failure prompt information page, so that the second terminal may access the failure prompt information page according to the URL and display the failure prompt information page on a display interface of the second terminal, to remind the user of the second terminal that the two-dimensional code scanned just now has become invalid.

In the method provided in this embodiment of the present invention, after scanning a graphic identifier of a target AP, to obtain an identity of the target AP, a terminal acquires, according to the identity and an operating system identifier of a terminal, target AP connection information prestored in a server; and connects to the target AP according to the target AP connection information, thereby implementing a connection to the target AP according to the graphic identifier of the target AP, which not only is convenient and fast, and time-saving and energy-saving, but also avoids, no matter how complex the access password is, a connection failure caused by an excessively complex access password during a connection; and in addition, for an AP owner, other terminals connect to the AP by using a graphic identifier of the AP, and therefore sharing of a wireless network can be implemented without sharing the access password, which protects privacy of the AP owner.

Figure 5:
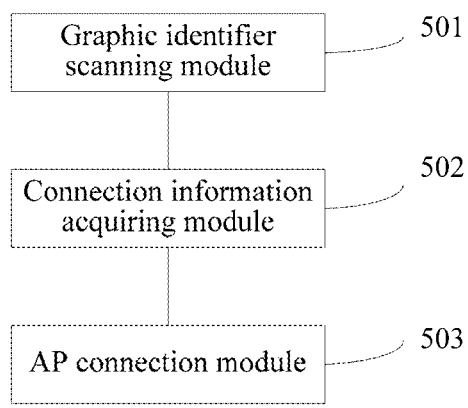
FIG. 5 is a schematic structural diagram of a terminal according to an embodiment of the present invention.

FIG. 5 is a schematic structural diagram of a terminal according to an embodiment of the present invention. Referring to FIG. 5, the terminal includes includes one or more processing units (CPU's), one or more network or other communications interfaces, a display, memory, and one or more communication buses for interconnecting these and various other components. The communication buses may include circuitry (sometimes called a chipset) that interconnects and controls communications between system components. The memory includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory may optionally include one or more storage devices remotely located from the CPU(s). The memory, including the non-volatile and volatile memory device(s) within the memory, comprises a non-transitory computer readable storage medium.

In some implementations, the memory or the non-transitory computer readable storage medium of the memory stores the following programs, modules and data structures, or a subset thereof including: a graphic identifier scanning module 501, a connection information acquiring module 502, and an AP connection module 503.

The graphic identifier scanning module 501 is configured to scan a graphic identifier of a target AP, to obtain address information of the target AP, where the address information includes at least an identity of the target AP; the connection information acquiring module 502 is connected to the graphic identifier scanning module 501, and configured to acquire, according to the identity and an operating system identifier of a terminal, target AP connection information prestored in a server; and the AP connection module 503 is connected to the connection information acquiring module 502, and is configured to connect to the target AP according to the target AP connection information.

Optionally, the connection information acquiring module is configured to generate a target AP connection request according to the identity and the operating system identifier of the terminal; send the target AP connection request to the server, so that the server acquires the target AP connection information according to the target AP connection request; and receive the target AP connection information returned by the server.

Optionally, when the operating system identifier is a first operating system identifier, the target AP connection information is an encrypted SSID and an encrypted access password of the target AP; and the AP connection module is configured to decrypt, according to a preset rule, the target AP connection information returned by the server, to obtain the SSID and the access password of the target AP; and invoke a terminal system service to connect to the target AP according to the SSID and the access password of the target AP.

Optionally, when the operating system identifier is a second operating system identifier, the AP connection module is configured to acquire, according to the target AP connection information, a configuration description file generated by the server; and invoke a terminal system service to install the configuration description file, to connect to the target AP.

Optionally, the terminal further includes:

a prompt information display module, configured to display, if the graphic identifier of the target AP becomes invalid, failure prompt information indicating a failure in acquiring the target AP connection information.

For the terminal provided in this embodiment of the present invention, after scanning a graphic identifier of a target AP, to obtain an identity of the target AP, the terminal acquires, according to the identity and an operating system identifier of the terminal, target AP connection information prestored in a server; and connects to the target AP according to the target AP connection information, thereby implementing a connection to the target AP according to the graphic identifier of the target AP, which not only is convenient and fast, and time-saving and energy-saving, but also avoids, no matter how complex the access password is, a connection failure caused by an excessively complex access password during a connection; and in addition, for an AP owner, other terminals connect to the AP by using a graphic identifier of the AP, and therefore sharing of a wireless network can be implemented without sharing the access password, which protects privacy of the AP owner.

Figure 6:
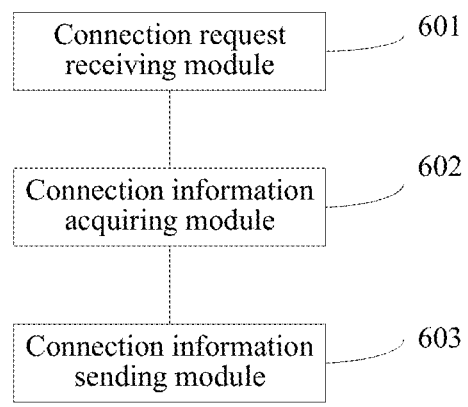
FIG. 6 is a schematic structural diagram of a server according to an embodiment of the present invention.

FIG. 6 is a schematic structural diagram of a server according to an embodiment of the present invention. The server includes memory; one or more processors for executing modules, programs and/or instructions stored in the memory and thereby performing predefined operations; one or more network or other communications interfaces; and one or more communication buses for interconnecting these components. In some implementations, the server includes a user interface comprising a display device and one or more input devices (e.g., keyboard or mouse). In some implementations, the memory includes high-speed random access memory, such as DRAM, SRAM, or other random access solid state memory devices. In some implementations, the memory includes non-volatile memory, such as one or more magnetic disk storage devices, optical disk storage devices, flash memory devices, or other non-volatile solid state storage devices. In some implementations, the memory includes one or more storage devices remotely located from the processor(s). The memory, or alternately one or more storage devices (e.g., one or more nonvolatile storage devices) within the memory, includes a non-transitory computer readable storage medium. In some implementations, the memory or the computer readable storage medium of the memory stores the following programs, modules and data structures, or a subset thereof: a connection request receiving module 601, a connection information acquiring module 602, and a connection information sending module 603.

The connection request receiving module 601 is configured to receive a target AP connection request sent by a terminal, the target AP connection request including an operating system identifier of the terminal and an identity of a target AP; the connection information acquiring module 602 is connected to the connection request receiving module 601, and configured to acquire target AP connection information according to the target AP connection request; and the connection information sending module 603 is connected to the connection information acquiring module 602, and configured to send the target AP connection information to the terminal, so that the terminal connects to the target AP according to the target AP connection information.

Optionally, the connection information acquiring module is configured to search, according to the identity when the operating system identifier is a first operating system identifier, a prestored correspondence between connection information and an identity for connection information corresponding to the identity, and determine the target AP connection information according to the found connection information, where the connection information includes an SSID and an access password; or acquire, when the operating system identifier is a second operating system identifier, download address information corresponding to the second operating system identifier, and use the download address information as the target AP connection information.

Optionally, the server further includes:

a connection information receiving module, configured to receive target AP connection information uploaded by the terminal connected to the target AP, where the target AP connection information includes at least an SSID and an access password of the target AP; and an identity configuration module, configured to configure at least the identity for the target AP.

Optionally, the server further includes:

an address information generating module, configured to generate address information of the target AP, where the address information includes at least the identity.

Optionally, the server further includes:

a graphic identifier generating module, configured to generate a graphic identifier corresponding to the address information; and a graphic identifier sending module, configured to return the graphic identifier to the terminal connected to the target AP.

For the server provided in this embodiment of the present invention, after scanning a graphic identifier of a target AP, a terminal sends a target AP connection request that includes an identity and an operating system identifier of the terminal to a server; and after obtaining the target AP connection request, the server acquires target AP connection information according to the target AP connection request, and sends the target AP connection information to the terminal, so that the terminal connects to the target AP according to the target AP connection information, thereby implementing a connection to the target AP according to the graphic identifier of the target AP, which not only is convenient and fast, and time-saving and energy-saving, but also avoids, no matter how complex the access password is, a connection failure caused by an excessively complex access password during a connection; and in addition, for an AP owner, other terminals connect to the AP by using a graphic identifier of the AP, and therefore sharing of a wireless network can be implemented without sharing the access password, which protects privacy of the AP owner.

It should be noted that the foregoing functional modules are only described for exemplary purposes when the terminal or server provided by the foregoing embodiments establishes a connection to an AP. In actual applications, the functions may be allocated to different functional modules according to specific needs, which means that the internal structure of the apparatus is divided to different functional modules to complete all or some of the above described functions. In addition, the terminal and the server provided by the foregoing embodiments are based on the same concept as the AP connection method in the foregoing embodiments. For the specific implementation process, refer to the method embodiments, and the details are not described herein again.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An access point (AP) connection method at a terminal having one or more processors and memory for storing programs to be executed by the processors, the method comprising:
   scanning, by the terminal, a graphic identifier of a target AP, to obtain address information of the target AP, the address information comprising at least an identity of the target AP, wherein the graphic identifier does not reveal an access password of the target AP to a user of the terminal;
   acquiring, by the terminal according to the identity of the target AP and an operating system identifier of the terminal, target AP connection information prestored in a server, the operating system identifier is selected from at least a first operating system identifier and a second operating system identifier; and
   automatically connecting, by the terminal, to the target AP according to the target AP connection information,
   wherein when the operating system identifier is a second operating system identifier, the target AP connection information is download address information, and the connecting to the target AP according to the target AP connection information comprises:
   acquiring, according to the target AP connection information, a configuration description file, the configuration description file being automatically generated by the server according to an SSID and the access password of the target AP; and
   invoking a terminal system service to install the configuration description file, to connect to the target AP automatically, such that an owner of the target AP does not need to share the access password with the user of the terminal, and the user of the terminal does not need to manually input the access password to connect to the target AP.

2. The method according to claim 1, wherein the acquiring, according to the identity and an operating system identifier of a terminal, target AP connection information prestored in a server comprises:
   generating a target AP connection request according to the identity of the target AP and the operating system identifier of the terminal;
   sending the target AP connection request to the server, so that the server acquires the target AP connection information according to the target AP connection request; and
   receiving the target AP connection information returned by the server.

3. The method according to claim 1, wherein when the operating system identifier is a first operating system identifier, the target AP connection information comprises an encrypted service set identifier (SSID) and an encrypted access password of the target AP, and the connecting to the target AP according to the target AP connection information comprises:
   decrypting, according to a preset rule, the target AP connection information returned by the server, to obtain the SSID and the access password of the target AP; and
   invoking a terminal system service to connect to the target AP according to the SSID and the access password of the target AP.

4. The method according to claim 3, further comprising:
   displaying, if the graphic identifier of the target AP becomes invalid, failure prompt information indicating a failure in acquiring the target AP connection information.

5. An AP connection method at a server having one or more processors and memory for storing programs to be executed by the processors, the method comprising:
   receiving a target AP connection request sent by a terminal, the target AP connection request comprising an operating system identifier of the terminal and an identity of a target AP, wherein the graphic identifier does not reveal an access password of the target AP to a user of the terminal;
   acquiring target AP connection information according to the target AP connection request; and
   sending the target AP connection information to the terminal, so that the terminal connects to the target AP according to the target AP connection information,
   wherein the acquiring target AP connection information according to the target AP connection request comprises:
   searching, according to the identity when the operating system identifier is a first operating system identifier, a prestored correspondence between connection information and an identity for connection information corresponding to the identity, and determining the target AP connection information according to the found connection information, wherein the connection information comprises an SSID and the access password; or
   acquiring, when the operating system identifier is a second operating system identifier, download address information corresponding to the second operating system identifier, and using the download address information as the target AP connection information, such that an owner of the target AP does not need to share the access password with the user of the terminal, and the user of the terminal does not need to manually input the access password to connect to the target AP.

6. The method according to claim 5, wherein before the receiving a target AP connection request sent by a terminal, the method further comprises:
   receiving target AP connection information uploaded by the terminal connected to the target AP, wherein the target AP connection information comprises at least an S SID and an access password of the target AP; and
   configuring at least the identity for the target AP.

7. The method according to claim 6, wherein after the configuring at least the identity for the target AP, the method further comprises:
   generating address information of the target AP, wherein the address information comprises at least the identity.

8. The method according to claim 7, wherein after the generating address information of the target AP, the method further comprises:
   generating a graphic identifier corresponding to the address information, and returning the graphic identifier to the terminal connected to the target AP.

9. A terminal, comprising:
one or more processors;
memory; and
one or more programs stored in the memory and to be executed by the processors, wherein when executing the one or more programs, the one or more processors are configured to:
scan a graphic identifier of a target AP, to obtain address information of the target AP, the address information comprising at least an identity of the target AP, wherein the graphic identifier does not reveal an access password of the target AP to a user of the terminal;
acquire, according to the identity and an operating system identifier of the terminal, target AP connection information prestored in a server, the operating system identifier is selected from at least a first operating system identifier and a second operating system identifier; and
automatically connect to the target AP according to the target AP connection information,
wherein when the operating system identifier is a second operating system identifier, the one or more processors are further configured to:
acquire, according to the target AP connection information, a configuration description file generated by the server, the configuration description file being automatically generated by the server according to an SSID and the access password of the target AP; and
invoke a terminal system service to install the configuration description file, to connect to the target AP automatically, such that an owner of the target AP does not need to share the access password with the user of the terminal, and the user of the terminal does not need to manually input the access password to connect to the target AP.

10. The terminal according to claim 9, wherein the one or more processors are further configured to generate a target AP connection request according to the identity and the operating system identifier of the terminal; send the target AP connection request to the server, so that the server acquires the target AP connection information according to the target AP connection request; and receive the target AP connection information returned by the server.

11. The terminal according to claim 9, wherein when the operating system identifier is a first operating system identifier, the target AP connection information comprises an encrypted SSID and an encrypted access password of the target AP; and the one or more processors are further configured to decrypt, according to a preset rule, the target AP connection information returned by the server, to obtain the SSID and the access password of the target AP; and invoke a terminal system service to connect to the target AP according to the SSID and the access password of the target AP.

12. The terminal according to claim 11, wherein the one or more processors are further configured to display, if the graphic identifier of the target AP becomes invalid, failure prompt information indicating a failure in acquiring the target AP connection information.

13. A server, comprising:
one or more processors;
memory; and
one or more programs stored in the memory and to be executed by the processors, wherein when executing the one or more programs, the one or more processors are configured to:
receive a target AP connection request sent by a terminal, the target AP connection request comprising an operating system identifier of the terminal and an identity of a target AP, wherein the target AP connection request is sent based on a graphic identifier scanned by the terminal, and the graphic identifier does not reveal an access password of the target AP to a user of the terminal;
acquire target AP connection information according to the target AP connection request; and
send the target AP connection information to the terminal, so that the terminal connects to the target AP according to the target AP connection information,
wherein the one or more processors are further configured to:
search, according to the identity when the operating system identifier is a first operating system identifier, a prestored correspondence between connection information and an identity for connection information corresponding to the identity, and
determine the target AP connection information according to the found connection information, wherein the connection information comprises an SSID and the access password; or acquire, when the operating system identifier is a second operating system identifier, download address information corresponding to the second operating system identifier, and use the download address information as the target AP connection information, such that an owner of the target AP does not need to share the access password with the user of the terminal, and the user of the terminal does not need to manually input the access password to connect to the target AP.

14. The server according to claim 13, wherein the one or more processors are further configured to:
receive target AP connection information uploaded by the terminal connected to the target AP, wherein the target AP connection information comprises at least an SSID and an access password of the target AP; and
configure at least the identity for the target AP.

15. The server according to claim 14, wherein the one or more processors are further configured to:
generate address information of the target AP, wherein the address information comprises at least the identity.

16. The server according to claim 15, wherein the one or more processors are further configured to:
generate a graphic identifier corresponding to the address information; and
return the graphic identifier to the terminal connected to the target AP.

17. The method according to claim 1, wherein the configuration description file is a WiFi plug-in.

* * * * *